(12) United States Patent
Takaki (10) Patent No.: US 11,275,385 B2
(45) Date of Patent: Mar. 15, 2022

(54) DRIVING SUPPORT DEVICE, STORAGE MEDIUM, AND DRIVING SUPPORT METHOD

(71) Applicant: DENSO CORPORATION, Kariya (JP)

(72) Inventor: Ryo Takaki, Kariya (JP)

(73) Assignee: DENSO CORPORATION, Kariya (JP)

(*) Notice: Subject to any disclaimer, the term of this patent is extended or adjusted under 35 U.S.C. 154(b) by 298 days.

(21) Appl. No.: 16/269,922

(22) Filed: Feb. 7, 2019

(65) Prior Publication Data
US 2019/0243382 A1  Aug. 8, 2019

(30) Foreign Application Priority Data

Feb. 8, 2018 (JP) .............................. JP2018-020580

(51) Int. Cl.
*G05D 1/02* (2020.01)
*G01C 21/34* (2006.01)
*G01C 21/16* (2006.01)
*G01C 21/36* (2006.01)

(52) U.S. Cl.
CPC ........... *G05D 1/0289* (2013.01); *G01C 21/16* (2013.01); *G01C 21/3476* (2013.01); *G01C 21/3691* (2013.01); *G05D 1/0214* (2013.01); *G05D 2201/0213* (2013.01)

(58) Field of Classification Search
CPC .............. G05D 1/0289; G05D 1/0214; G05D 2201/0213; G01C 21/16; G01C 21/3476; G01C 21/3691
See application file for complete search history.

(56) References Cited

U.S. PATENT DOCUMENTS

| 4,144,571 A | * | 3/1979 | Webber ................. G01C 5/005 244/175 |
| 2008/0243378 A1 | | 10/2008 | Zavoli |
| 2010/0082238 A1 | * | 4/2010 | Nakamura ............ G01C 21/32 701/532 |

FOREIGN PATENT DOCUMENTS

| EP | 1094299 A2 * | 4/2001 | ............ G01C 21/28 |
| JP | 2007-317018 A | 12/2007 | |
| JP | 2010-519550 A | 6/2010 | |
| JP | 2019-139401 | 8/2019 | |

* cited by examiner

*Primary Examiner* — Rami Khatib
*Assistant Examiner* — Shahira Baajour
(74) *Attorney, Agent, or Firm* — Maschoff Brennan (57) ABSTRACT

The driving support device executes self-position estimation of an own vehicle by odometry. In the case where landmarks around the own vehicle are detected, the driving support device corrects the self-position and creates an environment map. Next, the driving support device estimates the correction accuracy of the estimated self-position. In the case where the correction accuracy is high, the driving support device selects a first operating mode of driving support. In the case where the correction accuracy is low and the accuracy of odometry is also low, the driving support device selects a second operating mode of driving support. The second operating mode is a mode in which the degree of driving support is lower than that in the first operating mode.

12 Claims, 9 Drawing Sheets

DRIVING SUPPORT DEVICE, STORAGE MEDIUM, AND DRIVING SUPPORT METHOD

CROSS-REFERENCE TO RELATED APPLICATION

This application is based on and claims the benefit of priority from earlier Japanese Patent Application No. 2018-20580 filed Feb. 8, 2018, the description of which is incorporated herein by reference.

BACKGROUND OF THE INVENTION

1. Technical Field

The present disclosure relates to driving support.

2. Related Art

Conventionally, there is known a method for estimating the traveling trajectory of an own vehicle and other vehicles and performing a collision determination. In this method, the traveling trajectory of an own vehicle is estimated based on vehicle speed, steering angle, and yaw rate sensors. Furthermore, this method estimates the traveling trajectory of another vehicle based on the change in past position information of the other vehicle, and corrects the estimated traveling trajectory based on the change of the estimated past traveling trajectory.

SUMMARY OF THE INVENTION

In the present disclosure, provided is a driving support device as follows. The driving support device estimates a position of the own vehicle using a detection result by an internal sensor and position information of landmarks in the vicinity of the own vehicle and selects an operating mode of the driving support according to the accuracy of the estimated position of the own vehicle.

DETAILED DESCRIPTION OF THE PREFERRED EMBODIMENTS

The inventor of the present disclosure has studied the following technique as a driving support technique capable of appropriately performing driving support.

For example, the above related art is disclosed in JP 2007-317018 A (Japanese Patent Application No. 2007-317018). In the case of the above related art, the traveling trajectory of an own vehicle is estimated only by odometry using internal sensors, and is not corrected. Therefore, the estimation accuracy of the traveling trajectory may be low. In the case where the accuracy of the traveling trajectory is low, the accuracy of the collision determination may also be low. This kind of problem is common to all driving support using position estimation of an own vehicle. Based on the above, an object of the present disclosure is to solve this problem by appropriately implementing driving support using position estimation of an own vehicle.

One aspect of the driving support device according to the present disclosure is a driving support device mounted in a vehicle that includes: an acquiring device for acquiring position information of landmarks around an own vehicle; an internal sensor for detecting state quantities related to a traveling state of the own vehicle; and an actuator for performing driving support; the driving support device, including a first estimating unit for estimating a position of the own vehicle by dead reckoning using position information of the landmarks and a detection result by the internal sensor; a second estimating unit for estimating an estimation accuracy by the first estimating unit using the position information of the landmarks used by the first estimating unit; a selecting unit for selecting an operating mode of driving support provided by the actuator using the estimation accuracy estimated by the second estimation unit; and a support unit for executing a process for driving support according to the selected operation mode.

According to this aspect, it is possible to estimate the position of the own vehicle using the detection result by the internal sensor and the position information of the landmarks in the vicinity of the own vehicle, and to select the operating mode of the driving support according to the accuracy of the estimated position of the own vehicle, so driving support can be appropriately executed.

Hereinafter, embodiments for embodying the present disclosure will be described with reference to the drawings.

First Embodiment

Figure 1:
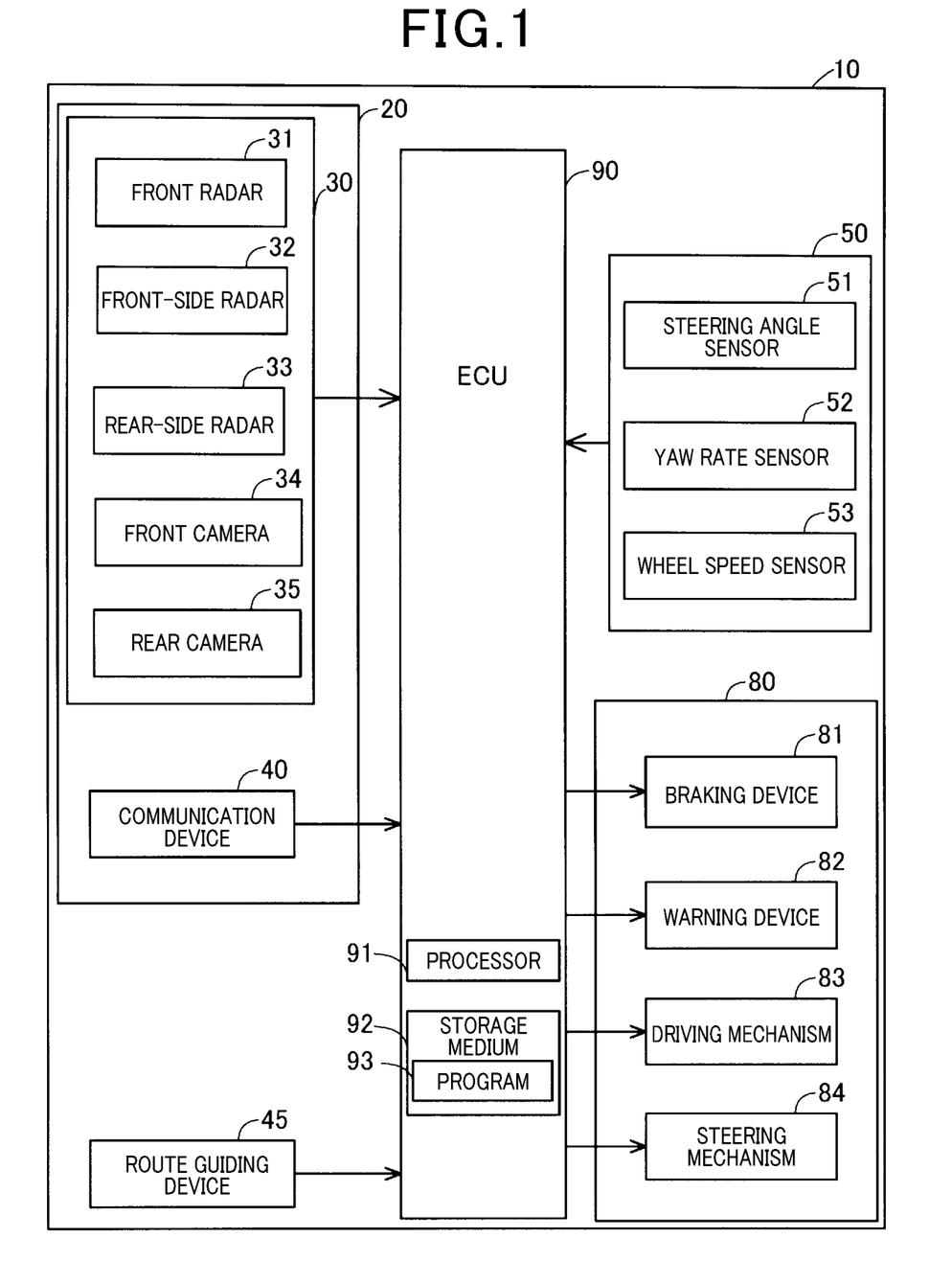
FIG. 1 is a block configuration diagram illustrating the internal structure of a vehicle.

A first embodiment will be explained. As illustrated in FIG. 1, the vehicle 10 includes acquiring devices 20, a route guiding device 45, internal sensors 50, actuators 80, and an ECU 90. The vehicle 10 is, for example, a four-wheeled automobile.

The acquiring devices 20 include external sensors 30 and a communication device 40. The information acquired by the acquiring devices 20 is collectively referred to as acquired information. The communication device 40 executes road-to-vehicle communication.

In the present embodiment, the external sensors 30 include a front radar 31, two front-side radars 32, two rear-side radars 33, a front camera 34, and a rear camera 35. The forward radar 31 is a millimeter wave radar with a frequency of 77 GHz. Both the front-side radars 32 and the rear-side radars 33 are millimeter wave radars with a frequency of 24 GHz. Both the front camera 34 and the rear camera 35 are monocular cameras. Incidentally, the external sensors 30 are not limited to these sensors.

Figure 2:
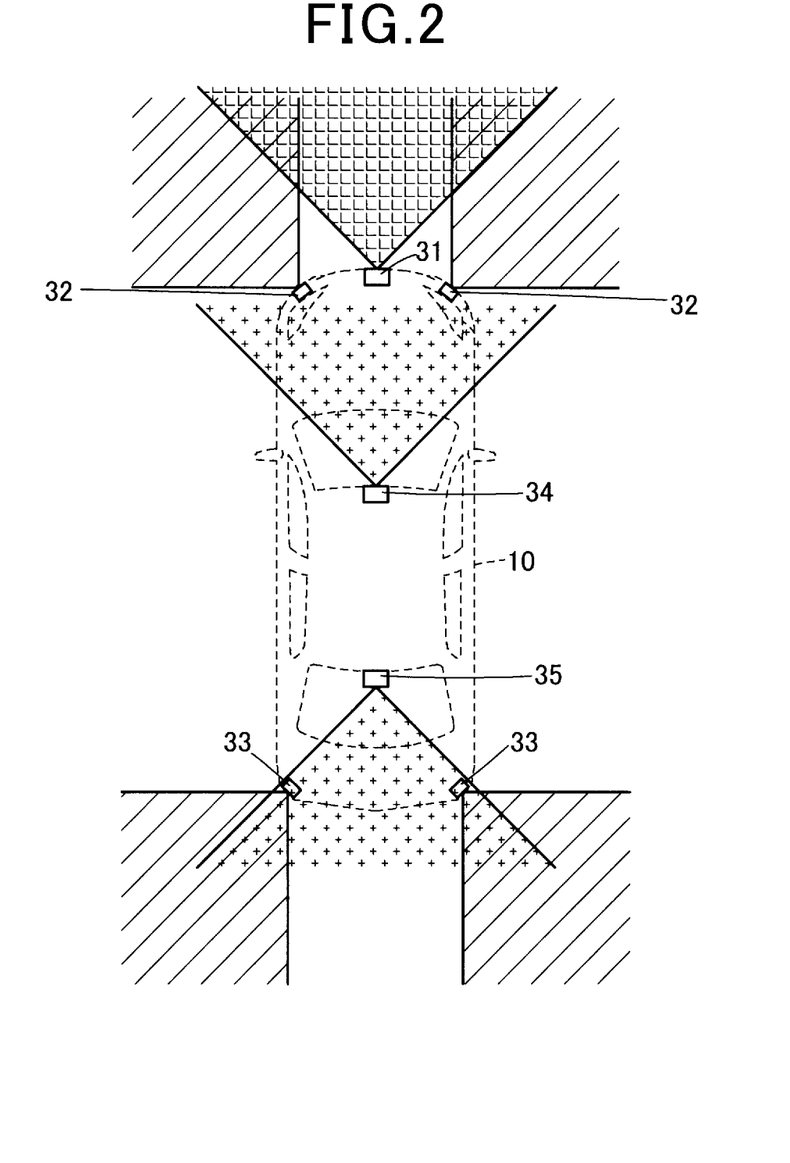
FIG. 2 is a diagram illustrating a sensing range of external sensors.

As illustrated in FIG. 2, the front radar 31 senses a range centered in front of the vehicle 10 (for example, a range of ±45 degrees). The front-side radars 32 sense a range centered on the front sides of the vehicle 10 (for example, a range of ±45 degrees). The front side of the vehicle 10 is the range centered on the right front oblique 45 degrees of the vehicle 10 and the range centered on the left front oblique 45 degrees. The rear-side radars 33 sense a range centered on the rear sides of the vehicle 10 (for example, a range of ±45 degrees). The rear side of the vehicle 10 is the range centered on the right rear oblique 45 degrees of the vehicle 10 and the range centered on the left rear oblique 45 degrees. The imaging range of the front camera 34 is a range centered on the front of the vehicle 10. The imaging range of the front camera 35 is a range centered on the rear of the vehicle 10. The sensing range of the radar and the imaging range of the camera are not limited to the above ranges.

The route guiding device 45 performs route guidance for the driver. The route guiding device 45 acquires information related to the road and information related to the weather from the outside through communication and inputs the information to the ECU 90. These items of information will be described later together with the odometry accuracy estimation process illustrated in FIG. 8.

The internal sensors 50 include sensors for detecting the state quantities related to the traveling state of the vehicle. The internal sensors 50 include a steering angle sensor 51 for detecting the steering angle of the vehicle 10, a yaw rate sensor 52 for detecting the yaw rate of the vehicle 10, and a wheel speed sensor 53 for acquiring the rotational speed of the wheels.

The actuators 80 include a braking device 81, a warning device 82, a driving mechanism 83, and a steering mechanism 84. The braking device 81 includes a foot brake and a brake ECU. The foot brake is a brake mechanism for braking in accordance with the depression amount of a brake pedal. Even though the brake pedal is not depressed, the brake ECU actuates the foot brake when instructed by the ECU 90. For example, the ECU 90 sends a control signal to the brake ECU to actuate the foot brake. Functioning of the foot brake in this way is called automatic braking.

The warning device 82 warns the driver about a risk of collision. The warning by the warning device 82 includes at least one of an output of a warning sound, a tightening of a seat belt, and a display by a head-up display.

The driving mechanism 83 includes an engine, an accelerator pedal, and at least one ECU. The term "engine" referred to here is used in a comprehensive sense including at least one of an internal combustion engine and an electric motor. The ECU included in the driving mechanism 83 operates the engine in accordance with the depression amount of the accelerator pedal or an instruction from the ECU 90. For example, the ECU 90 sends a control signal to the ECU included in the driving mechanism 83 to operate the engine.

The steering mechanism 84 includes a steering wheel, a motor for electric power steering, and a steering ECU. The steering ECU drives the motor in accordance with the rotation amount of the steering wheel or an instruction from the ECU 90. For example, the ECU 90 sends a control signal to the steering ECU to drive the motor.

The ECU 90 includes a processor 91 and a storage medium 92. The storage medium 92 is, for example, a non-transitory tangible computer-readable storage medium such as a semiconductor memory. The storage medium 92 stores a program for realizing a driving support process (described later). When the processor 91 executes a program stored in the storage medium 92, the ECU 90 executes a process for realizing the driving support method.

Figure 3:
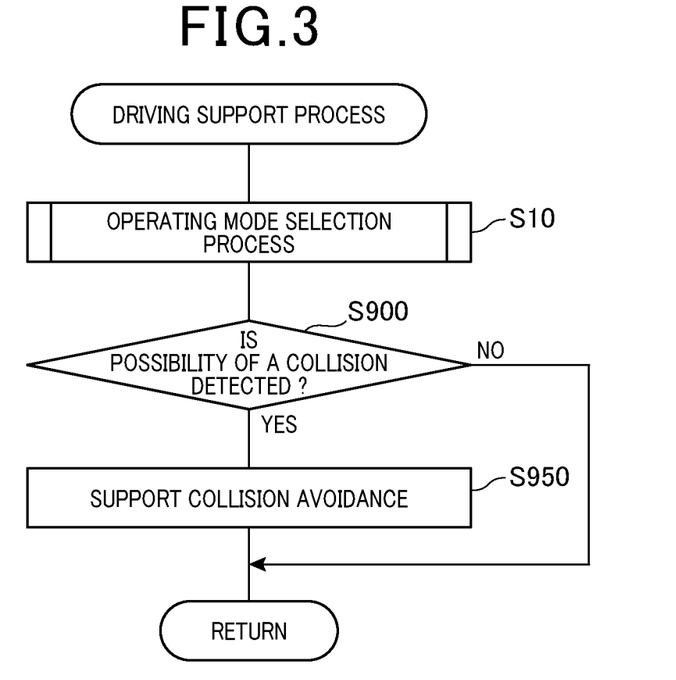
FIG. 3 is a flowchart illustrating a driving support process.

The driving support process illustrated in FIG. 3 is repeatedly executed by the ECU 90 while the vehicle 10 is traveling. More specifically, the driving support process in the present embodiment is a collision avoidance support process.

Figure 4:
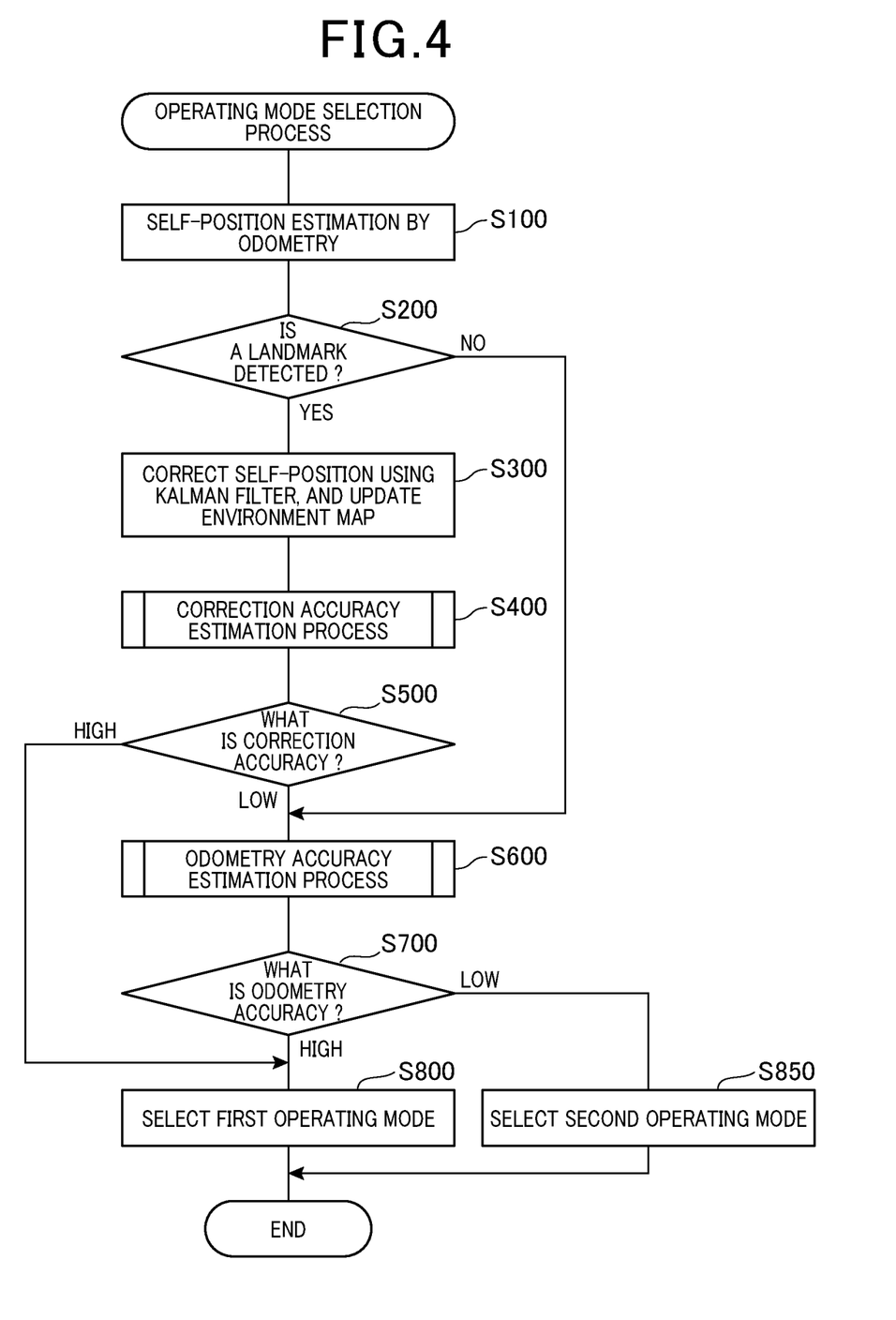
FIG. 4 is a flowchart illustrating an operating mode selection process.
Figure 5:
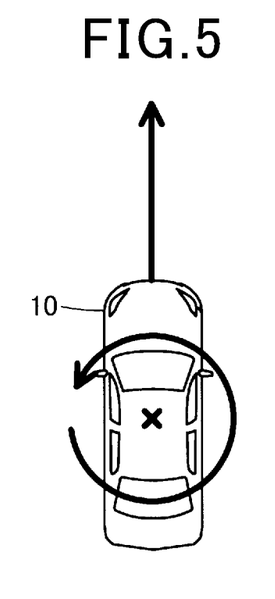
FIG. 5 is a diagram illustrating a method of calculating a position, traveling direction, traveling speed and angular velocity of a vehicle.

First, the ECU 90 executes an operating mode selection process as S10. As illustrated in FIG. 4, when the ECU 90 starts the operating mode selection process, the ECU 90 proceeds to S100 and executes self-position estimation using odometry. More specifically, as illustrated in FIG. 5, the position of an own vehicle by dead reckoning (hereinafter referred to as self-position), the traveling direction of the own vehicle, the traveling speed of the own vehicle, and the angular velocity of the own vehicle are calculated using the values acquired by the internal sensors 50 and the previous estimated values. The arrow in front of the vehicle 10 illustrated in FIG. 5 is a speed vector that represents the traveling direction and the traveling speed of the vehicle 10. The circular arrow on the vehicle 10 illustrated in FIG. 5 represents the angular velocity of the vehicle 10. The X mark on the vehicle 10 illustrated in FIG. 5 represents the self-position of the vehicle 10.

In the present embodiment, all values acquired by the steering angle sensor 51, the yaw rate sensor 52, and the wheel speed sensor 53 are used as values acquired by the internal sensors 50. Incidentally, in other embodiments, only a part of the acquired values of the steering angle sensor 51, the yaw rate sensor 52, and the wheel speed sensor 53 may be used. For example, only the acquired values of the yaw rate sensor 52 and the wheel speed sensor 53 may be used.

The self-position of a vehicle may be represented by latitude and longitude or in the XY coordinate system. This XY coordinate system is the world coordinate system. The origin of the XY coordinate system is, for example, a position where a push start switch of the vehicle 10 is pressed. The push start switch is a user interface for switching between a parked state and a traveling enabled state. The push start switch is also called a power switch.

Figure 6:
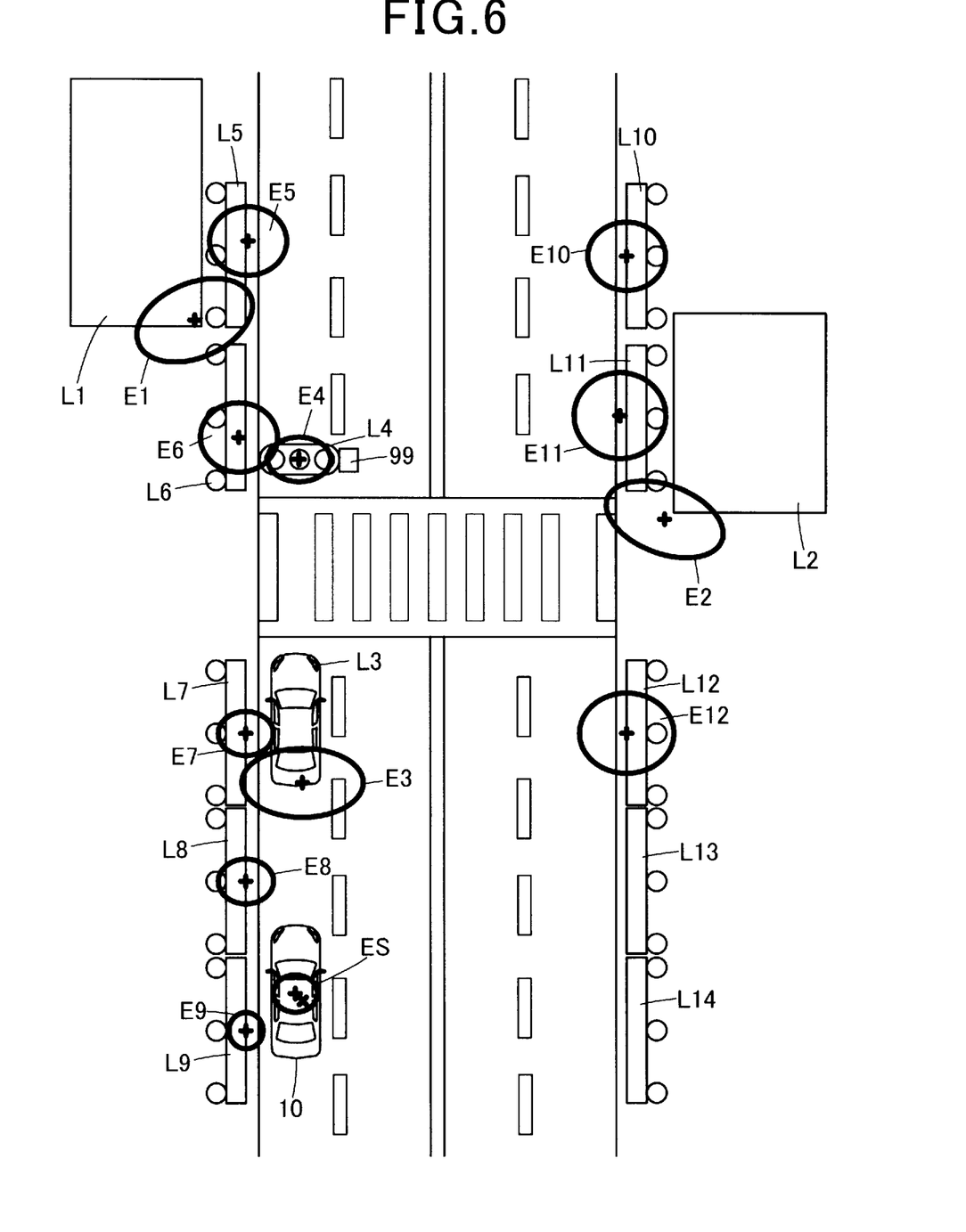
FIG. 6 is a diagram illustrating an environmental map including landmarks in the vicinity of an own vehicle and another vehicle.

Next, the ECU 90 proceeds to S200 and determines whether at least one landmark is being detected. The landmark referred to here is an object that can be used for SLAM. SLAM is an acronym for "Simultaneous Localization And Mapping", which is a method of simultaneously performing self-location estimation and environmental map creation. As illustrated in FIG. 6, the environment map in the present embodiment is expressed in two dimensions indicating the position in the horizontal direction. The ECU 90 stores the created environmental map in the storage medium 92.

The SLAM used in this embodiment is EKF-SLAM. EKF is an acronym for "Extended Kalman Filter", which is an extended Kalman filter. The ECU 90 in the present embodiment detects landmarks using information acquired by the front radar 31, the front-side radars 32, and the rear-side radars 33. Incidentally, in other embodiments, in addition to the information acquired by the front radar 31, the front-side radars 32, and the rear-side radars 33, or information acquired by radars in place of these radars, a landmark may be detected based on information acquired by the front camera 34 or the rear camera 35, information acquired by LIDAR, map information, information acquired by inter-vehicle communication, information acquired by road-to-vehicle communication, or the like, or a landmark may be detected by a combination of these. LIDAR and is an abbreviation for "Light Detection And Ranging". LIDAR is a type of radar.

As illustrated in FIG. 6, among the landmarks L1 to L14, those being detected by the ECU 90 mounted on the vehicle 10 are indicated with a +mark indicating the estimated position and an ellipse indicating the error range. This error range is determined based on the error covariance matrix calculated by the Kalman filter.

In the error range, combinations of Es and numbers are given as symbols. The number included in the code attached to the error range coincides with the number included in the code indicating the landmark. Incidentally, the X mark attached to the vehicle 10 is the self-position of the vehicle 10 estimated by S100, or in other words, is the deal-reckoning position before correction.

If no landmarks are detected, the ECU 90 determines NO in S200 and the process proceeds to S600 to be described later. Note that the landmarks detected in the past are appropriately deleted or stored as will be described later. The deletion of a landmark will be described later. Even in the case where no landmark is detected, when at least one landmark detected in the past is stored, the environment map is retained.

On the other hand, in the case where at least one landmark is being to detected, the ECU 90 determines YES in S200 and the process proceeds to S300. In S300, the ECU 90 corrects the deal-reckoning position estimated in S100 using the SLAM and updates the environment map.

Updating of the environment map referred to here means that in addition to correcting the position information of the landmarks with respect to the self-position of a vehicle, position information of landmarks is appropriately added and deleted. In SLAM, when there is information of landmarks located in front of the vehicle and relatively near an own vehicle, it is possible to improve accuracy of estimating the self-position. Therefore, information is deleted from the environment map for landmarks that the vehicle has passed by or landmarks for which a predetermined period of time has elapsed since detection. For example, in the present embodiment, information of a landmark located near an intersection is deleted when the vehicle leaves the intersection.

Figure 7:
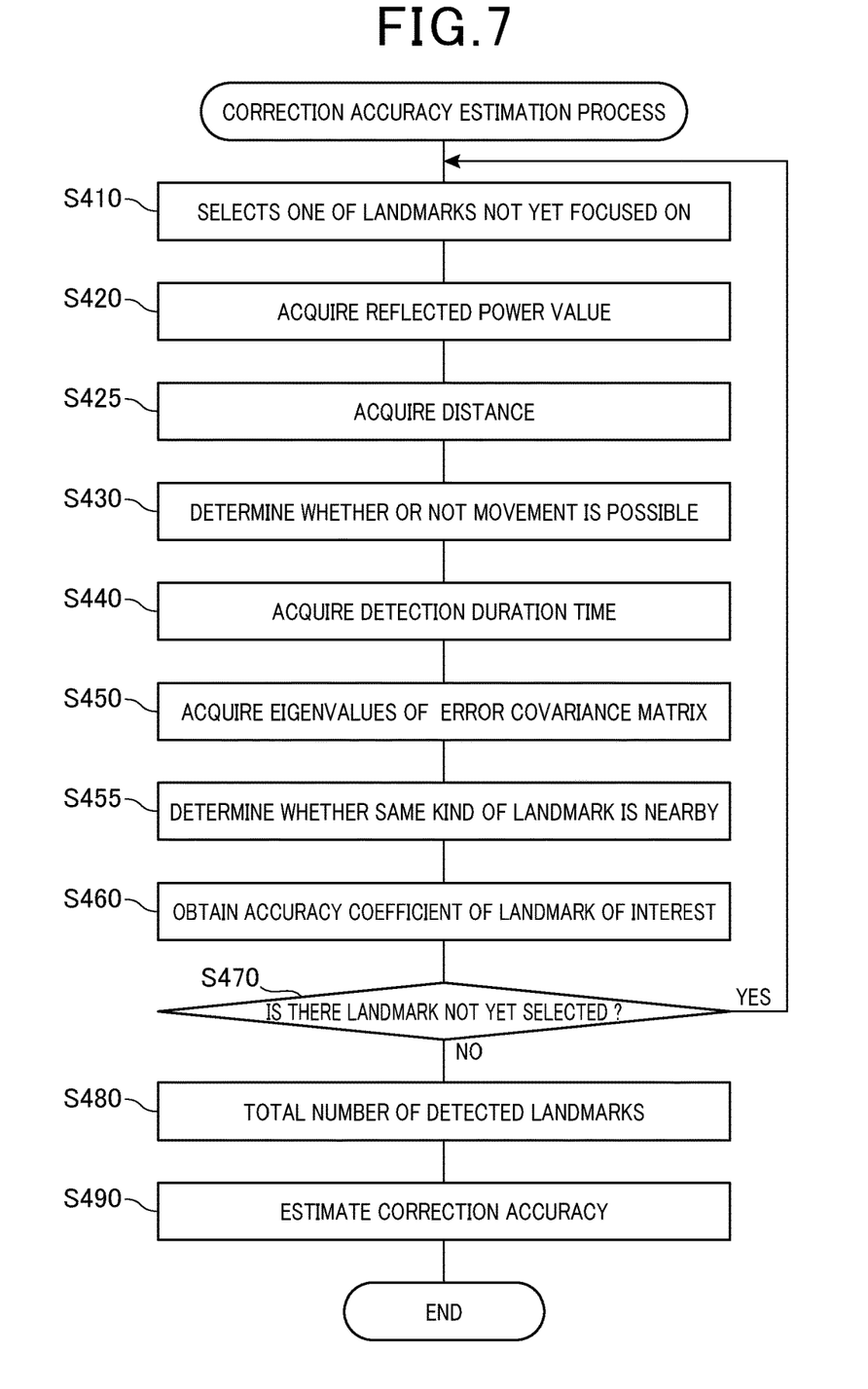
FIG. 7 is a flowchart illustrating a correction accuracy estimation process.

Next, the ECU 90 proceeds to S400 and executes a correction accuracy estimation process. As illustrated in FIG. 7, when the correction accuracy estimation process is started, the ECU 90 proceeds to S410 and selects one of the landmarks that has not yet been focused on.

The landmarks L1, L2 are high-rise buildings. In the case of observing a skyscraper located in front of or on the front side of the vehicle 10 with the external sensors 30, it is impossible to observe a site hidden behind the vehicle 10 as seen from the opposite side. Therefore, the sites that are normally observed as a high-rise building are two surfaces that adjoin the corners closest to the vehicle 10. In the present embodiment, the positions of the corners are treated as the positions of the landmarks L1 and L2 that are high-rise buildings. Incidentally, in other embodiments, sites other than the corners of the buildings may be used as positions of buildings as landmarks.

The landmark L3 is a preceding vehicle. In the present embodiment, landmarks are distinguished as landmarks that can move (moving object) and landmarks that do not move (stationary object). In the case of an automobile being the landmark, an automobile is a landmark that can move. In the present embodiment, only automobiles are used as landmarks that can move. Whether or not the observed landmark is an automobile is determined based on whether or not a shape characteristic to an automobile is detected. A shape characteristic of an automobile is, for example, a side mirror. In the case of an automobile being the preceding vehicle, the position of the automobile as the landmark is treated as the position of the landmark centered on the rear surface of the automobile as illustrated in FIG. 6.

Incidentally, in another embodiment, a method other than detection of a side mirror may be used to determine whether or not the landmark is an automobile. For example, in the case of detection using radar, whether the magnitude of reflected power is equivalent to that of an automobile may be used as a criterion. In the case of detection using the front camera 34, pattern matching may be used to determine whether or not the landmark is an automobile. In the case of detection using LIDAR, detection is performed based on the determination criterion of whether or not the shape of the reflection point matches the shape of an automobile, or whether or not reflection from reflectors arranged symmetrically on the rear surface of the automobile can be confirmed.

Further, in yet another embodiment, an object other than an automobile may be included as a movable landmark. In the case of this embodiment, for example, the movement speed of a landmark is measured based on the relative speed of the landmark with respect to an own vehicle and the speed of an own vehicle. The relative speed of the landmark with respect to an own vehicle is measured by using the front radar 31. It is possible to determine whether or not the detected landmark can move based on the movement speed obtained in this way. As a specific determination criterion, determination is made based on whether or not the above-described movement speed has become equal to or higher than a predetermined value. Incidentally, the device for detecting the relative speed is not limited to the forward radar 31, and a front camera 34, LIDAR, or the like may be used. In the case of using the front camera 34, LIDAR or the like, the relative speed can also be measured by differentiating the distance between the own vehicle and the landmark with respect to time.

The landmark L4 is a traffic light. A roadside device 99 is installed in this traffic light. The roadside device 99 communicates with the communication device 40. The roadside device 99 transmits information indicating the latitude and longitude where the roadside device 99 is located. The information transmitted from the roadside device 99 is used in S300. Note that in another embodiment, the detection of the traffic light may be performed using the front camera 34 or the rear camera 35 in addition to the communication with the roadside device 99 or instead of the communication with the roadside device 99. Moreover, in another embodiment, map information may be referenced.

The landmarks L5 to L14 are guardrails. The landmarks L13 and L14 are located outside the detection range of the external sensors 30, so they are not landmarks being detected. In S410, any one of the landmarks being detected is arbitrarily selected.

Next, the ECU 90 proceeds to S420 and acquires a power value reflected from a landmark being focused on (hereinafter referred to as the landmark of interest). Next, the ECU 90 proceeds to S425 and acquires the distance from the self-position of the vehicle 10 to the landmark of interest. The distance referred to here is the Euclidean distance. In other words, when considering a polar coordinate system with an own vehicle position as the origin, when the position of the landmark is represented as (r, θ), the above-mentioned distance corresponds to r. It should be noted that not only the distance to the landmark of interest but also the orientation may be acquired. The orientation is expressed as the above-mentioned 8.

Next, the ECU 90 proceeds to S430 to determine whether the landmark of interest can move. More specifically, as described above, it is determined whether the landmark is an automobile. As another embodiment, in the case where a landmark other than an automobile is included as a movable landmark, the determination criterion in S430 may be the movement speed of the landmark. Next, the ECU 90 proceeds to S440 and acquires the detection duration time of the landmark of interest. Next, the ECU 90 proceeds to S450 and acquires the eigenvalues of the error covariance matrix.

Next, the ECU 90 proceeds to S455 and determines whether the same kind of landmark exists near the landmark of interest. For example, in the case where the landmark of interest is a guardrail as the landmark L8, the landmarks L7 and L9 correspond to landmarks of the same type.

Incidentally, in another embodiment, even in the case where the type of landmark is not clear, the object may be registered as a landmark. More specifically, in the case of detection using radar or LIAR, a detected object satisfying the following two conditions may be registered as a landmark. (1) The power of the reflected waves is not less than a predetermined value. (2) The movement speed of the object is within a predetermined value. The movement speed can be obtained by a method using the above-described relative speed.

Moreover, even when the type of landmark is clear, the landmark is not limited to the above-mentioned buildings, automobiles, traffic lights, guardrails and the like. For example, a landmark may be a tree, a pedestrian crossing, a white line, a curb stone, a curved mirror, a street lamp, a signboard, a pedestrian bridge, a railroad crossing, a railroad track, or any other thing.

Next, the ECU 90 proceeds to S460 and obtains an accuracy coefficient of the landmark of interest. The accuracy factor is a value indicating how accurately a correction can be used when correcting the self-position estimation. The larger the accuracy factor is, the better the accuracy of the correction becomes.

The accuracy factor is determined using the values of S420 to S455. For the reflected power value and the detection duration time, the larger the value is, the higher the accuracy factor becomes. Since an automobile can move, the accuracy factor becomes smaller than in cases other than an automobile. The smaller the Euclidean distance to the self-position of a vehicle and the Eigenvalue of the error covariance matrix are, the larger the accuracy factor becomes. In the case where the same kind of landmark exists, the accuracy factor becomes smaller than in the case where this is not so. When landmarks of the same type exist near each other, confusion of landmarks is likely to occur. The ECU 90 determines the accuracy factor of each landmark by inputting these values to a map stored in advance.

The relationship between the values calculated in S420 to S455 and the like and the accuracy factor may be linear or nonlinear. For example, an accuracy factor may be calculated using an exponential function, and a lower limit value or an upper limit value may be set for an accuracy factor. For example, when setting the upper limit value, when the distance becomes equal to or less than the predetermined value, the accuracy factor may not be increased even though the distance may become shorter.

Next, the ECU 90 proceeds to S470 and determines whether there is a landmark that has not been selected. In the case where there is a landmark that has not been selected, the ECU 90 makes a YES decision in S470 and returns to S410. In the case where there is no landmark that has not been selected, the ECU 90 makes a NO decision in S470 and proceeds to S480 to total up the number of landmarks being detected.

Next, the ECU 90 proceeds to S490 and estimates the correction accuracy. To estimate the correction accuracy, the accuracy factor of each landmark acquired so far and the number of landmarks being detected are used. In the present embodiment, for example, the ECU 90 obtains a value indicating the correction accuracy by inputting the average value of the accuracy factors and the number of landmarks being detected into a map stored in advance. As a basic tendency, the greater the number of landmarks being detected is, the better the correction accuracy becomes. Note that in other embodiments, statistical values other than the average value of the accuracy factors may be used. For example, a median value, a minimum value, and a maximum value may be used. Alternatively, the statistical value may be an integrated value instead of an average value. In the case of an integrated value, as the number of landmarks increases, the calculated correction accuracy is more likely to be high, which is reasonable.

Next, the ECU 90 proceeds to S500 and determines the correction accuracy in S300. More specifically, when the value acquired in S490 is less than a reference value, it is determined that the correction accuracy is low, and when the value is equal to or greater than the reference value, it is determined that the correction accuracy is high. When the correction accuracy is high, the ECU 90 makes a decision of high in S500 and proceeds to S800, and sets the operating mode of collision avoidance support to the first mode. The first mode is the initial setting of the operating mode.

Figure 8:
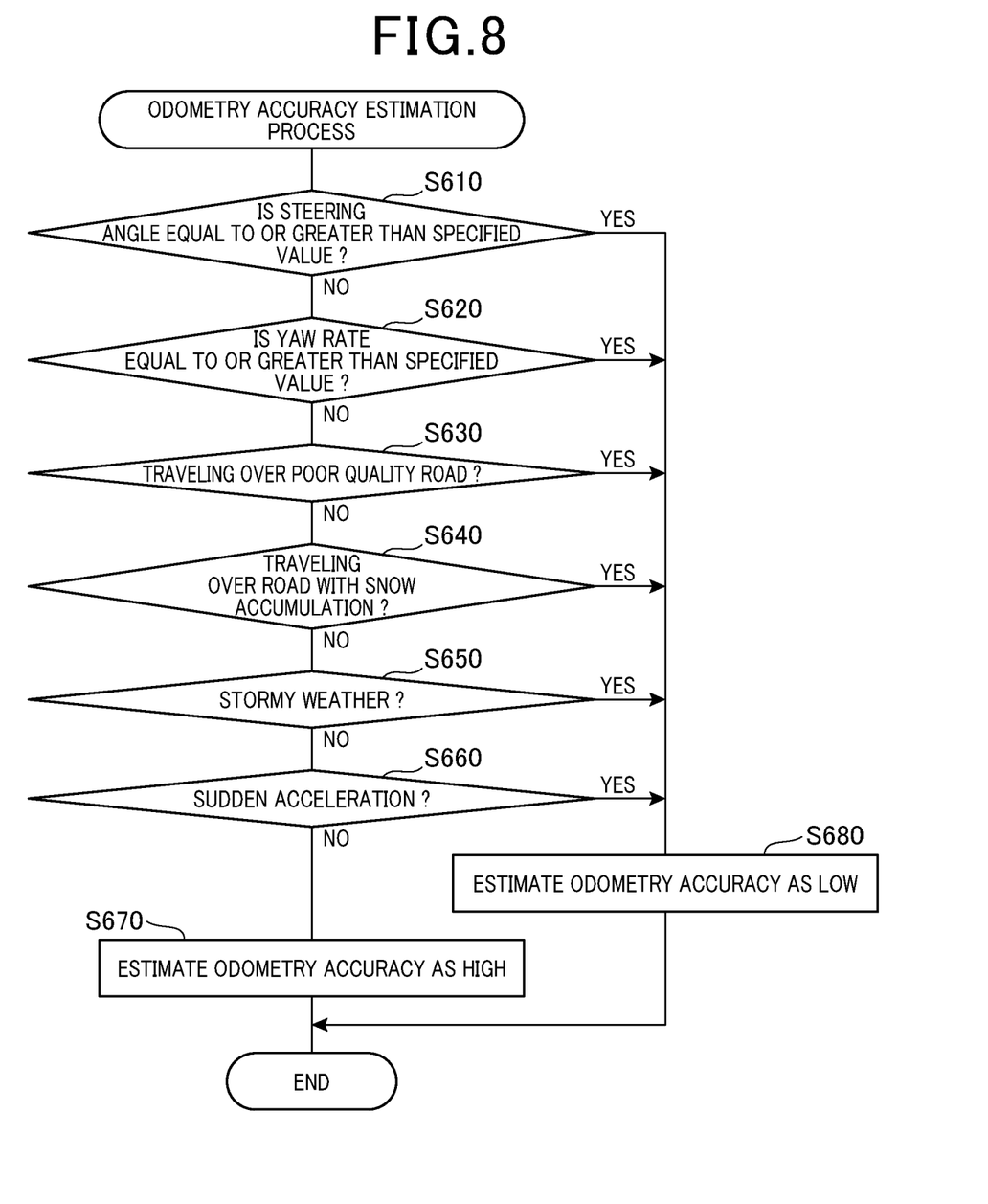
FIG. 8 is a flowchart illustrating an odometry accuracy estimation process.

On the other hand, in the case where the correction accuracy is low, the ECU 90 makes a decision of low in S500 and proceeds to S600 to execute the odometry accuracy estimation process. As illustrated in FIG. 8, when the ECU 90 starts the odometry accuracy estimating process, the ECU 90 proceeds to S610 and determines whether the steering angle is equal to or more than a predetermined value. In S610, a detection value by the steering angle sensor 51 is used. In the case where the steering angle is equal to or greater than a predetermined value, the ECU 90 makes a YES decision in S610 and proceeds to S680 and estimates that the accuracy of the odometry is low. The reason for this kind of estimation is that, when compared with the case in which a vehicle 10 is traveling straight, in the case where a vehicle 10 is turning it becomes easy for error to occur in the detected value by the yaw rate sensor 52.

In the case where the steering angle is less than the predetermined value, the ECU 90 makes a NO decision in S610 then proceeds to S620 and determines whether the yaw rate is equal to or greater than a predetermined value. In S620, detection by the yaw rate sensor 52 is used. In the case where the yaw rate is equal to or greater than the predetermined value, the ECU 90 makes a YES decision in S620 and proceeds to S680. S620 is a determination step having the same significance as S610.

In the case where the yaw rate is less than a predetermined value, the ECU 90 makes a NO decision in S620 and proceeds to S630 to determine whether the vehicle is traveling on a poor quality road. Poor quality roads, for example, are cobblestones, gravel roads, inclined roads, deserts and the like. The ECU 90 may determine whether a road is a poor quality road using information acquired from the route guiding device 45 or may be determined by analyzing an image captured by the front camera 34. The determination method in S640 and S650 described below is the same as the determination method in S630 described above.

In the case of traveling on a rough road, the ECU 90 makes a YES decision in S630 and proceeds to S680. The reason for making this kind of estimation is because tires are likely to slip on poor quality roads. If the tires slip, the value measured by the wheel speed sensor 53 deviates from the actual traveling distance.

In the case where the road being traveled on is not a poor quality road, the ECU 90 makes a NO decision in S630 and proceeds to S640 to determine whether or not snow is accumulated on the road being traveled on. In the case where snow is accumulated on the road being traveled on, the ECU 90 makes a YES decision in S640 and proceeds to S680. The reason for making this kind of estimation is the same as for poor quality roads.

If there is no snow accumulation on the road being traveled on, the ECU 90 makes a NO decision in S640 and proceeds to S650 to determine whether the weather at the current location is stormy. Stormy weather is, for example, heavy snow, heavy rain, strong wind, and the like. In the case where the weather at the current location is stormy, the ECU 90 makes a YES decision in S650 and proceeds to S680. The reason for making this kind of estimation is the same as for poor quality roads.

In the case where the weather at the current location is not stormy, the ECU 90 makes a NO decision in S650 and proceeds to S660 to determine whether the vehicle is accelerating rapidly. When the value measured by the wheel speed sensor 53 abruptly increases, the ECU 90 determines that the vehicle is accelerating rapidly. In the case where the vehicle is accelerating rapidly, the ECU 90 makes a YES decision in S660 and proceeds to S680. The reason for making this kind of estimation is that tires are likely to slip when the vehicle is accelerating rapidly. From a different viewpoint, when slipping occurs, the value measured by the wheel speed sensor 53 abruptly increases, so the determination by the above-described method can also be regarded as a detection of slipping.

In the case where the vehicle is not accelerating rapidly, the ECU 90 makes a NO decision in S660 and proceeds to S670 to estimate that the accuracy of the odometry is high.

After either S670 or S680, the ECU 90 proceeds to S700 and determines the estimation result in S600. In the case where it is estimated that the accuracy of the odometry is high, the process proceeds from S700 to S800. On the other hand, in the case where it is estimated that the accuracy of the odometry is low, the process proceeds from S700 to S850, and the second mode is selected as the operating mode of the collision avoidance support.

The second mode is different from the first mode. The second mode is an operating mode in which the degree of support is lower compared with that in the first mode. In the case of the first mode, the automatic brake can be activated even when the possibility of not operating in the second mode is high, and warnings by the warning device 82 are executed at earlier timing than in the case of the second mode.

After either S800 or S850, the ECU 90 finishes the operating mode selection process and proceeds to S900 illustrated in FIG. 3 to determine whether a risk of collision has been detected. In the case where the risk of collision has not been detected, the ECU 90 makes a NO decision in S900 and repeats the driving support process from S10. In the case where the risk of collision has been detected, the ECU 90 makes a YES decision in S900 and proceeds to S950 to perform collision avoidance support. For example, the ECU 90 sends a control signal to the braking device 81 to avoid collision with an object. After that, the ECU 90 repeats the driving support process from S10.

According to the present embodiment described above, it is possible to select the operating mode of collision avoidance support according to the accuracy of the self-position estimation, so appropriate collision avoidance support can be realized. The determination of the accuracy of the self-position estimation is performed for each of odometry and SLAM, so an appropriate determination result is obtained. Furthermore, since the situation of the road conditions, weather and the like are taken into consideration in order to accurately estimate the odometry, an appropriate determination result can be obtained.

Second Embodiment

A second embodiment will be described. This description of a second embodiment is mainly directed to points different from the first embodiment. The hardware configuration and other points, unless specifically described, are the same as those in the first embodiment.

Figure 9:
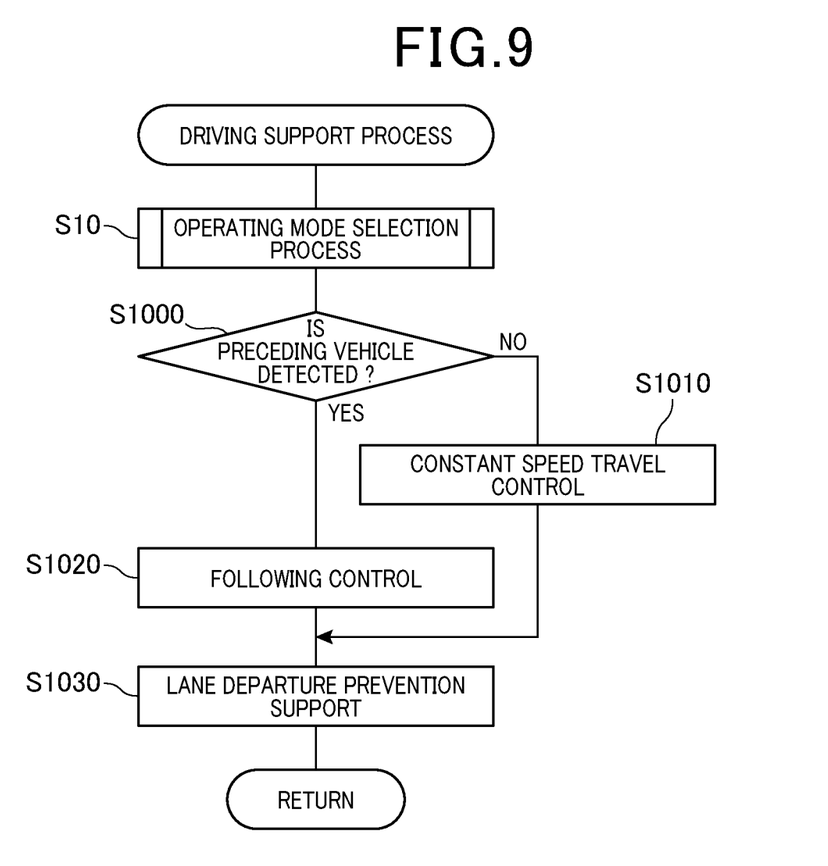
FIG. 9 is a flowchart illustrating a driving support process according to a second embodiment.

In the second embodiment, cruise control and lane departure prevention support are executed as driving support. As illustrated in FIG. 9, an operating mode selection process is also executed in the second embodiment. The flow of the operating mode selection process is substantially the same as that in the first embodiment. However, as the content of the support is different, as will be described later, the content of the selected operating mode is different from that in the first embodiment.

As illustrated in FIG. 9, after the operating mode selection process, the ECU 90 proceeds to S1000 and determines whether a preceding vehicle has been detected. The ECU 90 detects a preceding vehicle using the detection result of the front radar 31. In another embodiment, as a method of detecting the preceding vehicle, in addition to the front radar 31 or in place of the forward radar 31, at least one of the front camera 34, LIDAR, 3o sonar, inter-vehicle communication, road-to-vehicle communication or the like may be used.

In the case where a preceding vehicle is not detected, the ECU 90 makes a NO decision in S1000 and proceeds to S1010 to instruct the driving mechanism 83 to perform constant speed travel control. In order for this instruction, the ECU 90 inputs the speed set by the driver to the braking device 81 and the driving mechanism 83. The braking device 81 and the driving mechanism 83 maintain the inputted speed.

In the case where a preceding vehicle is detected, the ECU 90 makes a YES decision in S1000 and advances to S1020 to execute following control. More specifically, the ECU 90 instructs the braking device 81 and the driving mechanism 83 to keep the inter-vehicle distance with the preceding vehicle within a predetermined range. For example, the ECU 90 sends a control signal to the braking device 81 and/or the driving mechanism 83 to keep the inter-vehicle distance or the relative speed with the preceding vehicle within a predetermined range. The control performed in S1010 and S1020 is collectively referred to as cruise control.

After S1010 and S1020, the ECU 90 proceeds to S1030 and executes lane departure prevention support. More specifically, in the case where the ECU 90 detects that the vehicle is about to depart from the lane although the blinker is not blinking, the warning device 82 issues a warning. The ECU 90 determines whether or not the vehicle is about to depart from the lane by analyzing an image captured by the front camera 34. In another embodiment, in addition to the forward camera 34, as a method of detecting whether or not the vehicle is likely to depart from the lane, at least one of millimeter wave radar, LIDAR, map information, and GNSS information, or a combination of these methods may be used.

Furthermore, in the case where it is detected that the vehicle is about to depart from the lane, the ECU 90, by applying a steering force using the steering mechanism 84 as a lane departure prevention support, supports the steering operation so that it is easy for the vehicle to travel near the center of the lane. For example, the ECU 90 sends a control signal to the steering mechanism 84 to apply to steering force. After that, the ECU 90 returns to the operating mode selection process.

The operating mode in cruise control and lane departure prevention support will be described. In the case where the first mode is selected, both the cruise control and the lane departure prevention support operate in the initial setting mode. In the case where the second mode is selected, for the constant speed traveling control, the settable maximum speed is set to be slower than in the first mode. In the case where the second mode is selected, for following control, the inter-vehicle distance is set longer than in the first mode.

In the case where the second mode is selected, for lane departure prevention support, the criterion for determining "whether or not the vehicle is likely to depart from the lane" is changed so as to make it difficult for a warning and steering force to be applied. Therefore, in the first mode, even in a situation where it is determined that "the vehicle is likely to depart", it may be determined in the second mode that "the vehicle is not likely to depart".

According to the present embodiment described above, by appropriately selecting the operating mode, cruise control and lane departure prevention support can be appropriately executed.

The relationship between the embodiments and the claims will be described. The ECU 90 corresponds to a driving support device. S100 and S300 executed by the ECU 90 correspond to a first estimating unit, S400 executed by the ECU 90 corresponds to a second estimating unit, S600 executed by the ECU 90 corresponds to a third estimating unit, S500, S700, S800 and S850 executed by the ECU 90 correspond to a selecting unit, and S900, S950, S1010, S1020, and S1030 executed by the ECU 90 correspond to a supporting unit. A determination result of High in S500 (the correction accuracy of the estimated self-position being high) corresponds to a first degree, a determination result of Low in S500 (the correction accuracy of the estimated self-position being low) corresponds to a second degree, a determination result of High in S700 (the estimated odometry accuracy being high) corresponds to a third degree, and a determination result of Low in S700 (the estimated odometry accuracy being low) corresponds to a fourth degree. The detection result by the external sensors 30 and the information acquired by the communication device 40 correspond to acquired information.

The technique according to present disclosure is not limited to the embodiments described in the present specification and can be realized in various configurations within a range not departing from the gist thereof. For example, in order to solve part or all of the above-described problems, or in order to achieve part or all of the above-described effects, the technical features in embodiments corresponding to the technical features of each mode described in the Summary of the present application can be replaced or combined as appropriate. Unless technical features are described here as being essential, the features can be deleted as appropriate. For example, the following embodiments are exemplified.

The external sensors 30 may include at least one sensor. The sensors included in the external sensors 30 are not limited to those exemplified as embodiments. For example, the frequency band of the radar may be any range. At least one of the front radar 31, the front-side radars 32, and the rear-side radars 33 may be a LIDAR. At least one of the front camera 34 and the rear camera 35 may be a stereo camera.

At least one of the latitude/longitude, the traveling direction, the traveling speed and the angular velocity of an own vehicle may be used as the target of estimation by SLAM.

The SLAM may be, for example, a UKF-SLAM using an unscented Kalman filter, a SLAM using a particle filter, or a FAST-SLAM combining various filters.

The parameters used for the odometry accuracy estimation process may be at least one of those described together with FIG. 8.

In order to further a lower degree of support of the operating mode, in addition to delaying the operation timing of the automatic brake or warning, the strength of the operation mode may be weakened or the duration of the operation may be shortened. For example, the braking force by the automatic brake may be weakened, the volume of the warning sound may be reduced, and the warning sound may be issued for a shorter time.

The change of the operating mode of the automatic brake and the warning need not be linked, and may be changed independently. For example, it is possible to change the operating mode of only the warning.

As driving support in the second embodiment, in addition to cruise control and lane departure prevention support, or instead of cruise control and lane departure prevention support, another driving support may be carried out. More specifically, at least one of automatic lane change, automatic parking, and the automatic driving may be carried out.

Automobile lane change is a function to automatically change the lane by automatically controlling the steering angle and the acceleration and deceleration. In order to perform an automatic lane change, it is detected whether there is a lane to which lane change is possible, and whether there is an object that an own vehicle can collide with in the lane-change destination. Whether there is a lane to which lane change is possible is detected using the front camera 34 and map information. Whether there is an object that an own vehicle can collide with in the lane-change destination is detected using an external sensor such as millimeter wave radar, the front camera 34, the rear camera 35, LIDAR, sonar or the like.

When changing the operating mode for the automatic lane change, the criterion of whether or not a lane change is possible may be changed. For example, in the case of a higher degree of support of the operating mode, compared with the case of a lower degree of support of the operating mode, the inter-vehicle distance condition with respect to a preceding vehicle or a following vehicle in the lane-change destination may be shortened, or the steering amount for a lane change may be increased. When the steering amount is large, lane change becomes faster.

Automatic parking is a function of automatically performing parking by automatically controlling the steering angle and the acceleration and deceleration. In order to perform automatic parking, whether there is an area where an own vehicle can be parked, and whether there is an object in the parking destination that an own vehicle can collide with are detected. Whether there is an area where an own vehicle can be parked is detected using the front camera 34, the rear camera 35, map information, and the like. Whether there is an object in the parking destination that an own vehicle can collide with is detected by using external sensors such as radar, the front camera 34, the rear camera 35, LIDAR, sonar, and the like.

When changing the operating mode for automatic parking, the criterion for determining whether or not parking is possible may be changed. For example, in the case where the operation mode is a lower degree of support, a criterion is adopted that automatic parking is not executed when a space of 30 cm or more in the front and rear, and on the left and right as clearance between the vehicle body and the area where parking is possible cannot be maintained. In the case of this embodiment, when the operating mode is strong, the standard for the clearance may be changed to 10 cm in the front and rear, and on the left and right.

Automatic driving is a combination of functions such as the above-described automatic brake, cruise control, lane departure prevention support, automatic lane change, automatic parking and the like. When changing the operating mode, change such as described above is performed for each function.

The odometry accuracy estimation process as S600 may be omitted. In that case, the determination step of S700 is also omitted. In the case of this embodiment, when it is determined that the correction accuracy is low in S500, the process may proceed to S850 and the second mode may be selected.

At least one of the estimation accuracy of SLAM and the estimation accuracy of the odometry may be determined in three or more levels. In the case of this embodiment, a mode having three or more levels may be prepared for the operating mode and may be selected according to the estimation accuracy.

When estimating the odometry accuracy, as a case where the accuracy is low may include a case where the vehicle is traveling on a slope or a case where the speed is decelerated suddenly.

The driving support device does not need to be one of the ECU 90. For example, the collision avoidance support device may be configured by cooperation of a plurality of ECUs. Alternatively, the collision avoidance support device may be a computer incorporated in any of the components of the external sensors 30. For example, a computer that is incorporated in the forward radar 31 may be used.

What is claimed is:

1. A driving support device mounted in an own vehicle, the own vehicle comprising:
    an acquiring device configured to acquire position information of landmarks around an own vehicle;
    an internal sensor configured to detect state quantities related to a traveling state of the own vehicle; and
    an actuator configured to perform driving support,
    the driving support device comprising:
    a first estimating unit configured to estimate a position of the own vehicle by dead reckoning using the position information of the landmarks and the detected state quantities by the internal sensor;
    a second estimating unit configured to estimate an estimation accuracy of the position of the own vehicle estimated by the first estimating unit using the position information of the landmarks used by the first estimating unit;
    a selecting unit configured to select an operating mode of the driving support provided by the actuator in response to comparing the estimation accuracy to a reference value; and
    a support unit configured to execute a process for the driving support according to the selected operating mode, wherein
    the second estimating unit estimates the estimation accuracy of the estimated position of the own vehicle at, at least two levels, the at least two levels comprising:
        a first degree which indicates a first correction accuracy of the estimated position of the own vehicle; and
        a second degree which indicates a second correction accuracy of the estimated position of the own vehicle that is lower than the first degree, the first correction accuracy and the second correction accuracy each indicating an accuracy of the estimated position of the own vehicle based on statistical information regarding an accuracy of the position information of the landmarks, and
    the selecting unit selects a first mode which indicates the operating mode of the driving support in a case where the estimation accuracy of the estimated position of the own vehicle is estimated on the basis of the first degree, and selects a second mode providing a lower degree of support than that of the first mode in a case where the estimation accuracy of the estimated position of the own vehicle is estimated on the basis of the second degree.

2. The driving support device according to claim 1, wherein
    the driving support is collision avoidance support; and
    the actuator includes at least one of a control device and a warning device.

3. The driving support device according to claim 1, wherein
    the acquiring device includes at least one of a millimeter wave radar, a monocular camera, and a LIDAR.

4. The driving support device according to claim 1, further comprising
    a third estimating unit configured to estimate the estimation accuracy of the estimated position of the own vehicle at, at least two levels, the two levels comprising:
        a third degree which indicates a first odometry estimation accuracy; and
        a fourth degree which indicates a second odometry estimation accuracy lower than
    the third degree; wherein
    the selecting unit selects the first mode providing a higher degree of support than that of the second mode when the third estimating unit has estimated that the estimation accuracy of the estimated position of the own vehicle is estimated on the basis of the third degree, even in a case where the second estimating unit has estimated that the estimation accuracy of the estimated position of the own vehicle is estimated on the basis of the second degree.

5. The driving support device according to claim 4, wherein
    the driving support device detects that there is snow accumulated on a road the own vehicle is travelling on, in response to determining that a value measured by a wheel speed sensor deviates from an actual traveling distance of the own vehicle;
    the third estimating unit estimates the fourth degree in a case where snow is accumulated on the road the own vehicle is traveling on; and
    the selecting unit selects the second mode when the third estimating unit has estimated that the estimation accuracy of the estimated position of the own vehicle is estimated on the basis of the fourth degree, in a case where the second estimating unit has estimated that the estimation accuracy of the estimated position of the own vehicle is estimated on the basis of the second degree.

6. The driving support device according to claim 4, wherein
the selecting unit selects the first mode when a value indicating the first odometry estimation accuracy is equal to or greater than the reference value, even in a case where a value indicating the first correction accuracy of the estimated position of the own vehicle is less than the reference value.

7. The driving support device according to claim 1, wherein
the first estimating unit
estimates that the estimation accuracy of the estimated position of the own vehicle is the first degree in a case where a number of landmarks indicated by the position information of the landmarks is a first number or higher, and
estimates that the estimation accuracy of the estimated position of the own vehicle is the second degree in a case where the number of the landmarks is smaller than the first number.

8. The driving support device according to claim 1, wherein
the first estimating unit estimates the position of the own vehicle using a Kalman filter and creates an environment map using the position information of the landmarks.

9. The driving support device according to claim 1, wherein
the first estimating unit further estimates at least one of a traveling direction of the own vehicle, a speed of the own vehicle, and an angular velocity of the own vehicle.

10. The driving support device according to claim 1, wherein
the selecting unit selects the first mode in case where a value indicating the first correction accuracy of the estimated position of the own vehicle is equal to or greater than the reference value and selects the second mode in case where the value indicating the second correction accuracy of the estimated position of the own vehicle is less than the reference value.

11. A non-transitory computer-readable storage medium containing thereon a program comprising instructions configured to cause a processor mounted in a vehicle to execute a driving support process, the vehicle comprising:
an acquiring device configured to acquire position information of landmarks around an own vehicle;
an internal sensor configured to detect state quantities related to a traveling state of the own vehicle; and
an actuator configured to perform driving support,
the instructions comprising:
executing a first estimation for estimating a position of the own vehicle by dead reckoning using the position information of the landmarks and the detected state quantities by internal sensor;
executing a second estimation for estimating an estimation accuracy of the position of the own vehicle estimated by the first estimation using the position information of the landmarks used for the first estimation;
selecting an operating mode of the driving support provided by the actuator in response to comparing the estimation accuracy to a reference value; and
executing a process for the driving support according to the selected operating mode, wherein
the second estimating unit estimates the estimation accuracy of the estimated position of the own vehicle at, at least two levels, the at least two levels comprising:
a first degree which indicates a first correction accuracy of the estimated position of the own vehicle: and
a second degree which indicates a second correction accuracy of the estimated position of the own vehicle that is lower than the first degree, the first correction accuracy and the second correction accuracy each indicating an accuracy of the estimated position of the own vehicle based on statistical information regarding an accuracy of the position information of the landmarks, and
the selecting unit selects a first mode which indicates the operating mode of the driving support in a case where the estimation accuracy of the estimated position of the own vehicle is estimated on the basis of the first degree, and selects a second mode providing a lower degree of support than that of the first mode in a case where the estimation accuracy of the estimated position of the own vehicle is estimated on the basis of the second degree.

12. A driving support method for an own vehicle, the own vehicle comprising:
an acquiring device configured to acquire position information of landmarks around an own vehicle;
an internal sensor configured to detect state quantities related to a traveling state of the own vehicle; and
an actuator configured to perform driving support,
the driving support method comprising the steps of:
executing a first estimation for estimating a position of the own vehicle by dead reckoning using position information of the landmarks and the detected state quantities by the internal sensor;
executing a second estimation for estimating an estimation accuracy of the position of the own vehicle estimated by the first estimation using the position information of the landmarks used for the first estimation;
selecting an operating mode of the driving support provided by the actuator in response to comparing the estimation accuracy to a reference value; and
executing a process for the driving support according to the selected operating mode,. wherein
the second estimating unit estimates the estimation accuracy of the estimated position of the own vehicle at, at least two levels, the at least two levels comprising:
a first degree which indicates a first correction accuracy of the estimated position of the own vehicle; and
a second degree which indicates a second correction accuracy of the estimated position of the own vehicle that is lower than the first degree, the first correction accuracy and the second correction accuracy each indicating an accuracy of the estimated position of the own vehicle based on statistical information regarding an accuracy of the position information of the landmarks, and
the selecting unit selects a first mode which indicates the operating mode of the driving support in a case where the estimation accuracy of the estimated position of the own vehicle is estimated on the basis of the first degree, and selects a second mode providing a lower degree of support than that of the first mode in a case where the estimation accuracy of the estimated position of the own vehicle is estimated on the basis of the second degree.

\* \* \* \* \*